US012767789B2

(12) United States Patent
Endo et al.

(10) Patent No.: US 12,767,789 B2
(45) Date of Patent: Oct. 20, 2026

(54) CURABLE RESIN COMPOSITION

(71) Applicant: ADEKA CORPORATION, Tokyo (JP)

(72) Inventors: Takeshi Endo, Kitakyushu (JP); Yasuyuki Mori, Kitakyushu (JP); Ken-ichi Tamaso, Kuki (JP); Ryo Ogawa, Kuki (JP); Junji Ueyama, Kuki (JP)

(73) Assignee: ADEKA CORPORATION, Tokyo (JP)

( * ) Notice: Subject to any disclaimer, the term of this patent is extended or adjusted under 35 U.S.C. 154(b) by 590 days.

(21) Appl. No.: 18/262,521

(22) PCT Filed: Jan. 25, 2022

(86) PCT No.: PCT/JP2022/002587
§ 371 (c)(1),
(2) Date: Jul. 21, 2023

(87) PCT Pub. No.: WO2022/168666
PCT Pub. Date: Aug. 11, 2022

(65) Prior Publication Data
US 2024/0317967 A1 Sep. 26, 2024

(30) Foreign Application Priority Data
Feb. 3, 2021 (JP) ................................ 2021-016044

(51) Int. Cl.
*C08K 5/3415* (2006.01)
*C08G 59/50* (2006.01)

(52) U.S. Cl.
CPC ........ *C08K 5/3415* (2013.01); *C08G 59/5073* (2013.01)

(58) Field of Classification Search
CPC .......................... C08K 5/3415; C08G 59/5073
See application file for complete search history.

(56) References Cited

U.S. PATENT DOCUMENTS 4,066,625 A 1/1978 Bolger
4,340,715 A 7/1982 Gounder et al.

FOREIGN PATENT DOCUMENTS

| | | | |
|---|---|---|---|
| CN | 109456672 | A | 3/2019 |
| JP | 2007297493 | A | 11/2007 |
| JP | 2008239683 | A | 10/2008 |
| JP | 2011219740 | A | 11/2011 |
| JP | 2018090660 | A | 6/2018 |
| JP | 2018203991 | A | 12/2018 |
| JP | 2019038989 | A | 3/2019 |

OTHER PUBLICATIONS

English machine translation of JP 2011-219740A. (Year: 2011).*
Office Action, issued in Chinese Patent Application No. 202280010156.0 dated Sep. 18, 2025.
Kudo K et al., "Imidazole-Type Thermal Latent Curing Agents with High Miscibility for One-Component Epoxy Thermosetting Resins", Journal of Polymer Science, Part A: Polymer Chemistry, Published May 20, 2016, pp. 2680-2688.
Kudo K et al., "O-Fmoc-Protected 3-Hydroxy-2-Butenoate Derivatives as Thermal Latent Curing Agents for Thermosetting Epoxy Resins", Journal of Polymer Science, Part A: Polymer Chemistry, Published Dec. 19, 2017, pp. 471-474.
Yang S et al., "Synthesis of maleimide modified imidazole derivatives and their application in one-component epoxy resin systems", Online: https://www.sciencedirect.com/science/article/abs/pii/S0167577X18315386?via%3Dihub, Jan. 1, 2019, pp. 379-383, vol. 234, Materials Letters; Elsevier.
Zhang Q et al., "Facile construction of one-component intrinsic flame-retardant epoxy resin system with fast curing ability using imidazole-blocked bismaleimide", Online:https://www.sciencedirect.com/science/article/abs/pii/S1359836819329932?via%3Dihub, Accepted Aug. 24, 2019, 10 pages, vol. 177, Composites Part B, Elsevier.

(Continued)

*Primary Examiner* — John E Uselding
(74) *Attorney, Agent, or Firm* — NIXON & VANDERHYE

(57) ABSTRACT

A curing resin composition well balanced in curing properties and storage stability. The composition contains (A) an epoxy resin, (B) a curing agent, and (C) at least one of imide compounds represented by formulae (1-1), (1-2), and (1-3), wherein $R^{11}$ represents an optionally substituted alkyl group with 1 to 10 carbon atoms, etc.; $R^1$, $R^2$, $R^3$, and $R^4$ each independently represent a hydrogen atom, an alkyl group with 1 to 10 carbon atoms, etc.; and $R^{12}$ and $R^{13}$ each independently represent a hydrogen atom, an optionally substituted alkyl group with 1 to 10 carbon atoms, etc.

(1-1)

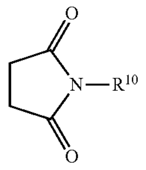

(1-2)

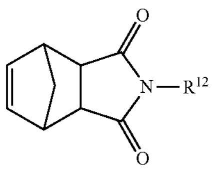

(1-3)

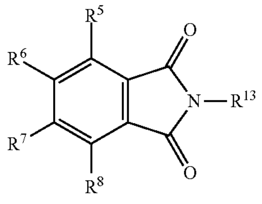

20 Claims, No Drawings

(56) References Cited

OTHER PUBLICATIONS

International Search Report for PCT/JP2022/002587 mailed Mar. 22, 2022, 4 pages.
Written Opinion of the ISA for PCT/JP2022/002587 mailed Mar. 22, 2022, 3 pages.

* cited by examiner

CURABLE RESIN COMPOSITION

CROSS-REFERENCE TO RELATED APPLICATIONS

This application is the U.S. national phase of International Application No. PCT/JP2022/002587 filed Jan. 25, 2022 which designated the U.S. and claims priority to JP 2021-016044 filed Feb. 3, 2021, the entire contents of each of which are hereby incorporated by reference.

TECHNICAL FIELD

The present invention relates to a curing resin composition, more particularly a curing resin composition containing an epoxy resin, a curing agent, and an imide compound having an aromatic ring structure.

BACKGROUND ART

Epoxy resins are widely used in industrial applications such as coatings, adhesives, and various molding materials. In these applications, an epoxy resin is usually used in combination with a curing agent. Various curing agents are known, including acid anhydride curing agents, amine curing agents, and phenol curing agents.

Different curing agents are used depending on the application. For example, imidazole curing agents, which are classified as anionic polymerization curing agents, are particularly effective even in small amounts, in contrast to addition polymerization curing agents. Additionally, imidazole curing agents exhibit low volatility and toxicity, making them well-suited for use in electrical/electronic components.

When an epoxy curing agent is used alone, however, it is challenging to strike a balance between curing properties and storage stability of the curing resin composition. To improve storage stability, patent literature 1 below proposes the use of a reaction product between an imidazole compound and an epoxy resin in an epoxy curing system, and patent literature 2 below proposes an epoxy resin curing composition containing a modified imidazole, a modified amine, and a phenolic compound.

Nevertheless, when such a modification approach is adapted, the resulting modified compound has an increased viscosity, which impairs the handling and workability.

CITATION LIST

Patent Literature

Patent literature 1: U.S. Pat. No. 4,066,625
Patent literature 2: JP 2007-297493A

Non-Patent Literature

Non-patent literature 1: Journal of Polymer Science, Part A: Polymer Chemistry 2016, 54, 2680-2688
Non-patent literature 2: Journal of Polymer Science, Part A: Polymer Chemistry 2018, 56, 471-474
Non-patent literature 3: Composites Part B 17 (2019) 107 380
Non-patent literature 4: Materials Letters 234 (2019) 379-383

SUMMARY OF INVENTION

An object of the present invention is to provide a curing resin composition having a good balance between curing properties and storage stability.

As a result of extensive investigations, the inventors have found that a curing resin composition containing an epoxy resin, a curing agent, and a specific imide compound exhibits a good balance between curing properties and storage stability and reaches the present invention.

The present invention relates to a curing resin composition containing (A) an epoxy resin, (B) a curing agent, and (C) at least one of imide compounds represented by formulae (1-1), (1-2), and (1-3):

[Chem. 1]

(1-1)

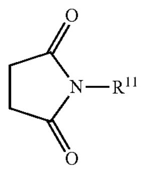

(1-2)

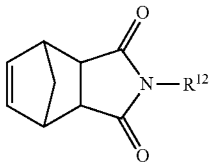

(1-3)

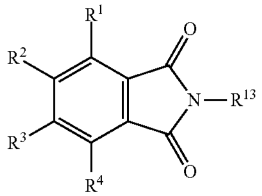

wherein $R^{11}$ represents an optionally substituted alkyl group having 1 to 10 carbon atoms, an optionally substituted aryl group having 6 to 20 carbon atoms, or an optionally substituted arylalkyl group having 7 to 20 carbon atoms; $R^1$, $R^2$, $R^3$, and $R^4$ each independently represent a hydrogen atom, an alkyl group having 1 to 10 carbon atoms, an alkoxy group having 1 to 10 carbon atoms, a haloalkyl group having 1 to 10 carbon atoms, a haloalkoxy group having 1 to 10 carbon atoms, an alkoxycarbonyl group having 2 to 10 carbon atoms, a halogen atom, a nitro group, a nitrile group, an amino group, or a glycidyloxy group; $R^{12}$ and $R^{13}$ each independently represent a hydrogen atom, an optionally substituted alkyl group having 1 to 10 carbon group, an optionally substituted aryl group having 6 to 20 carbon atoms, or an optionally substituted arylalkyl group having 7 to 20 carbon atoms; and the substituent optionally being on $R^{11}$, $R^1$, $R^2$, $R^3$, $R^4$, $R^{12}$ and $R^{13}$ is an alkyl group with 1 to 10 carbon atoms, an alkoxy group with 1 to 10 carbon atoms, a haloalkyl group with 1 to 10 carbon atoms, a haloalkoxy group with 1 to 10 carbon atoms, a halogen atom, a nitro group, a nitrile group, an amino group, or a glycidyloxy group.

Advantageous Effects of Invention

According to the present invention, a curing resin composition excellent in both curing properties and storage stability is provided. The curing resin composition of the present invention is well suited as a one-component curing resin composition.

DESCRIPTION OF EMBODIMENTS

The curing resin composition of the present invention is described hereunder. The curing resin composition of the present invention contains (A) an epoxy resin, (B) a curing resin, and (C) a specific imide compound.

The epoxy resin as component (A) is not particularly limited in molecular structure, molecular weight, and the like, provided that it has at least two epoxy groups per molecule.

Examples of the epoxy resin (A) include polyglycidyl ethers of mononuclear polyhydric phenol compounds, such as hydroquinone, resorcin, pyrocatechol, and phloroglucinol; polyglycidyl ethers of polynuclear polyhydric phenol compounds, such as dihydroxynaphthalene, biphenol, methylenebisphenol (i.e., bisphenol F), methylenebis(ortho-cresol), ethylidenebisphenol, isopropylidenebisphenol (i.e., bisphenol A), isopropylidenebis(ortho-cresol), tetrabromobisphenol A, 1,3-bis(4-hydroxycumylbenzene), 1,4-bis(4-hydroxycumylbenzene), 1,1,3-tris(4-hydroxyphenyl)butane, 1,1,2,2-tetra(4-hydroxyphenyl)ethane, thiobisphenol, sulfobisphenol, oxybisphenol, phenol novolak, ortho-cresol novolak, ethylphenol novolak, butylphenol novolak, octylphenol novolak, resorcin novolak, and terpene phenol; polyglycidyl ethers of polyhydric alcohols, such as ethylene glycol, propylene glycol, butylene glycol, hexanediol, polyethylene glycol, polypropylene glycol, dicyclopentadiene dimethanol, thiodiglycol, 2,2-bis(4-hydroxycyclohexyl)propane (i.e., hydrogenated bisphenol A), glycerol, trimethylolpropane, pentaerythritol, sorbitol, and bisphenol A alkylene oxide adducts; homo- or copolymers of glycidyl methacrylate or glycidyl esters of aliphatic, aromatic or alicyclic polybasic acids, such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesic acid, pyromellitic acid, tetrahydrophthalic acid, and endomethylenetetrahydrophthalic acid, epoxy compounds having a glycidylamino group, such as N,N-diglycidylaniline, bis(4-(N-methyl-N-glycidylamino)phenyl)methane, diglycidyl o-toluidine, N,N-bis(2,3-epoxypropyl)-4-(2,3-epoxypropyl)-4-(2,3-epoxypropoxy)-2-methylaniline, N,N-bis(2,3-epoxypropyl)-4-(2,3-epoxypropoxy)aniline, and N,N,N',N'-tetra(2,3-epoxypropyl)-4,4-diaminodiphenylmethane; epoxidized cyclic olefin compounds, such as vinylcyclohexene diepoxide, cyclopentanediene diepoxide, 3,4-epoxycyclohexylmethyl-3,4-epoxycyclohexanecarboxylate, 3,4-epoxy-6-methylcyclohexylmethyl-6-methylcyclohexanecarboxylate, and bis(3,4-epoxy-6-methylcyclohexylmethyl) adipate; epoxidized conjugated diene polymers, such as epoxidized polybutadiene and epoxidized styrene-butadiene copolymers; and heterocyclic compounds, such as triglycidyl isocyanurate. These epoxy resins may be internally crosslinked by an isocyanate-terminated prepolymer, or their molecular weight may be increased using a polyactive hydrogen compound, e.g., a polyhydric phenol, a polyamine, a carbonyl-containing compound, or a polyphosphoric ester. The epoxy resins may be used either individually or in combination of two or more thereof.

Preferred of the recited epoxy resins (A) are polyglycidyl ethers of polyhydric phenol compounds or polymers thereof, with polyglycidyl ethers of bisphenols, such as bisphenol A and bisphenol F, or their polymers being more preferred. In particular, liquid epoxy resins are suitable to provide a one-component curing resin composition.

The curing agent as component (B) includes acid anhydrides, phenols, amines, polythiols, and imidazoles.

Examples of the acid anhydride curing agent include himic anhydride, phthalic anhydride, maleic anhydride, methylhimic anhydride, succinic anhydride, tetrahydrophthalic anhydride, hexahydrophthalic anhydride, methyltetrahydrophthalic anhydride, methylhexahydrophthalic anhydride, trialkyltetrahydrophthalic anhydride maleic anhydride adducts, benzophenonetetracarboxylic anhydride, trimellitic anhydride, pyromellitic anhydride; and hydrogenated methylnadic anhydride.

Examples of the phenol curing agent include polyhydric phenol compounds, such as phenol novolak resins, cresol novolak resins, aromatic hydrocarbon formaldehyde resin-modified phenol resins, dicyclopentadiene phenol adduct resins, phenol aralkyl resins (Xyloc resins), naphthol aralkyl resins, trisphenylolmethane resins, tetraphenylolethane resins, naphthol novolak resins, naphthol-phenol cocondensate novolak resins, naphthol-cresol cocondensate novolak resins, biphenyl-modified phenol resins (polyhydric phenol compounds having phenol nuclei linked by bismethylene), biphenyl-modified naphthol resins (polyhydric naphthol compounds having phenol nuclei linked by bismethylene), aminotriazine-modified phenol resins (compounds having a phenol structure, a triazine ring, and a primary amino group in the molecule), and alkoxy-containing aromatic ring-modified novolak resins (polyhydric phenol compounds having a phenol nucleus and an alkoxy-containing aromatic ring linked by formaldehyde).

Examples of the amine curing agent include alkylenediamines, such as ethylenediamine, 1,2-diaminopropane, 1,3-diaminopropane, 1,3-diaminobutane, 1,4-diaminobutane, hexamethylenediamine, and m-xylenediamine; polyalkylpolyamines, such as diethylenetriamine, triethylenetriamine, and tetraethylenepentamine; alicyclic polyamines, such as 1,4-diaminocyclohexane, 1,3-diaminocyclohexane, 1,3-diaminomethylcyclohexane, 1,2-diaminocyclohexane, 1,4-diamino-3,6-diethylcyclohexane, 4,4'-diaminodicyclohexylmethane, 1,3-bis(aminomethyl)cyclohexane, 1,4-bis(aminomethyl)cyclohexane, 4,4'-diaminodicyclohexylpropane, bis(4-aminocyclohexyl) sulfone, 4,4'-diaminodicyclohexyl ether, 2,2'-dimethyl-4,4'-diaminodicyclohexylmethane, isophoronediamine, and polyamines, such as diaminodiphenylmethane, norbornenediamine; aromatic diaminodiphenylsulfone, diethyltoluenediamine, 1-methyl-3,5-diethyl-2,4-diaminobenzene, 1-methyl-3,5-diethyl-2,6-diaminobenzene, 1,3,5-triethyl-2,6-diaminobenzene, 3,3'-diethyl-4,4'-diaminodiphenylmethane, and 3,5,3',5'-tetramethyl-4,4'-diaminodiphenylmethane; N,N-dimethylaminoethylamine, N,N-diethylaminoethylamine, N,N-diisopropylaminoethylamine, N,N-diallylaminoethylamine, N,N-benzylmethylaminoethylamine, N,N-dibenzylaminoethylamine, N,N-cyclohexylmethylaminoethylamine, N,N-dicyclohexylaminoethylamine, N-(2-aminoethyl)pyrrolidine, N-(2-aminoethyl)piperidine, N-(2-aminoethyl)morpholine, N-(2-aminoethyl)piperazine, N-(2-aminoethyl)-N'-methylpiperazine, N,N-dimethylaminopropylamine, N,N-diethylaminopropylamine, N,N-diisopropylaminopropylamine, N,N-diallylaminopropylamine, N,N-benzylmethylaminopropylamine, N,N-dibenzylaminopropylamine, N,N-cyclohexylmethylaminopropylamine, N,N-dicyclohexylaminopropylamine, N-(3-aminopropyl)pyrrolidine, N-(3-aminopropyl)piperidine, N-(3-aminopropyl)morpholine, N-(3-aminopropyl)piperazine, N-(3-aminopropyl)-N'-methylpiperidine, 4-(N,N-dimethylamino)benzylamine, 4-(N,N-diethylamino)benzylamine, 4-(N,N-diisopropylamino)benzylamine, N,N-dimethylbisaminocyclohexane, N,N-dimethylisophoronediamine, N,N,N'-trimethylethylenediamine, N'-ethyl-N,N-dimethylethylenediamine, N,N,N'-triethylethylenediamine, N'-ethyl-N,N-dimethylpropanediamine, N'-ethyl-N,N-dibenzylaminopropylamine; N,N-(bisaminopropyl)-N-methylamine, N,N-bisaminopropylethylamine, N,N-bisaminopropylpropylamine, N,N-bisaminopropylbutylamine, N,N-bisaminopropylpentylamine, N,N-bisaminopropylhexylamine, N,N-bisaminopropyl-2-ethylhexylamine, N,N-bisaminopropylcyclohexylamine, N,N-bisaminopropylbenzylamine, N,N-bisaminopropylallylamine, bis[3-(N,N-dimethylaminopropyl)]amine, bis[3-(N,N-diethylaminopropyl)]amine, bis[3-(N,N-diisopropylaminopropyl)]amine, bis[3-(N,N-dibutylaminopropyl)]amine; dibasic acid dihydrazides, such as oxalic dihydrazide, malonic dihydrazide, succinic dihydrazide, glutaric dihydrazide, adipic dihydrazide, suberic dihydrazide, azelaic dihydrazide, sebacic dihydrazide, and phthalic dihydrazide; guanidine compounds, such as dicyandiamide, benzoguanamine, and acetoguanamine; and melamine.

Modified amine curing agents derived from the above-enumerated amines are also useful. Amine modification methods include dehydration condensation with a carboxylic acid, addition reaction with an epoxy compound, addition reaction with an isocyanate compound, Michael addition reaction, Mannich reaction, condensation with urea, and condensation with a ketone.

Examples of the carboxylic acid that can be used to modify the amines include aliphatic, aromatic, or alicyclic polybasic acids, such as maleic acid, fumaric acid, itaconic acid, succinic acid, glutaric acid, suberic acid, adipic acid, azelaic acid, sebacic acid, dimeric acid, trimeric acid, phthalic acid, isophthalic acid, terephthalic acid, trimellitic acid, trimesic acid, pyromellitic acid, tetrahydrophthalic acid, hexahydrophthalic acid, and endomethylenetetrahydrophthalic acid.

Examples of the epoxy compound that can be used to modify the amines include those recited above as the epoxy resin (A).

Examples of the isocyanate compound that can be used to modify the amines include aromatic diisocyanates, such as 2,4-tolylene diisocyanate, 2,6-tolylene diisocyanate, diphenylmethane-4,4'-diisocyanate, phenylene diisocyanate, xylylene diisocyanate, tetramethylxylylene diisocyanate, 1,5-naphthylene diisocyanate, 1,5-tetrahydronaphthylene diisocyanate, 3,3'-dimethyldiphenyl-4,4'-diisocyanate, dianisidine diisocyanate, and tetramethylxylylene diisocyanate; alicyclic diisocyanates, such as isophorone diisocyanate, dicyclohexylmethane-4,4'-diisocyanate, trans-1,4-cyclohexyl diisocyanate, and norbornene diisocyanate; aliphatic diisocyanates, such as tetramethylene diisocyanate, 1,6-hexamethylene diisocyanate, 2,2,4- and/or 2,4,4-trimethylhexamethylene diisocyanate, and lysine diisocyanate; isocyanurate trimers, biuret trimers, or trimethylolpropane adducts of the above recited diisocyanates; triphenylmethane triisocyanate, 1-methylbenzole-2,4,6-triisocyanate, and dimethyltriphenylmethane tetraisocyanate. These isocyanate compounds may be used in a modified form, such as carbodiimide-, isocyanurate- or biuret-modified, or in a blocked form blocked with various blocking agents.

Examples of the polythiol curing agent include pentaerythritol tetrakis(3-mercaptopropionate), pentaerythritol tetrakis(thioglycolate), dipentaerythritol hexakis(3-mercaptopropionate), dipentaerythritol hexakis(3-mercaptobutyrate), 1,3,4,6-tetrakis(2-mercaptoethyl)-1,3,4,6-tetraazaoctahydropentalene-2,5-dione, 1,3,5-tris(3-mercaptopropyl)-1,3,5-triazine-2,4,6(1H,3H,5H)-trione, 4-mercaptomethyl-1,8-dimercapto-3,6-dithiaoctane, 4,8-, 4,7-, or 5,7-dimercaptomethyl-1,11-dimercapto-3,6,9-trithiaundecane, and 1,3,4,6-tetrakis(2-mercaptoethyl)glycoluril.

Examples of the imidazole curing agent include 2-methylimidazole, 2-ethyl-4-methylimidazole, 2-isopropylimidazole, 2-undecylimidazole, 2-heptadecylimidazole, 2-phenylimidazole, 2-phenyl-4-methylimidazole, 2-aminopropylimidazole, 1-phenylmethyl-2-imidazole, 1-phenylmethyl-2-ethyl-4-methylimidazole, 1-phenylmethyl-2-phenylimidazole, 1-butoxycarbonylethyl-2-methylimidazole, 1-butoxycarbonylethyl-2-ethyl-4-methylimidazole, 1-butoxycarbonylethyl-2-phenylimidazole, 1-(2-ethylhexyl)carbonylethyl-2-methylimidazole, 1-(2-ethylhexyl)carbonylethyl-2-ethyl-4-methylimidazole, 1-(2-ethylhexyl)carbonylethyl-2-phenylimidazole, 1-octyloxycarbonylethyl-2-methylimidazole, 1-octyloxycarbonylethyl-2-ethyl-4-methylimidazole, 1-octyloxycarbonylethyl-2-phenylimidazole, hexanediol bis(2-methylimidazolylethanoic acid) ester, hexanediol bis(2-ethyl-4-methylimidazolylethanoic acid) ester, hexanediol bis(2-phenylimidazolylethanoic acid) ester, decanediol bis(2-methylimidazolylethanoic acid) ester, decanediol bis(2-ethyl-4-methylimidazolylethanoic acid) ester, decanediol bis(2-phenylimidazolylethanoic acid) ester, tricyclopentanedimethanol bis(2-methylimidazolylethanoic acid) ester, tricyclopentanedimethanol bis(2-ethyl-4-methylimidazolylethanoic acid) ester, tricyclopentanedimethanol bis(2-phenylimidazolylethanoic acid) ester, 1-(2-hydroxynaphthylmethyl)-2-methylimidazole, 1-(2-hydroxynaphthylmethyl)-2-ethyl-4-methylimidazole, 1-(2-hydroxynaphthylmethyl)-2-phenylimidazole, and an imidazolesilane compound (e.g., 2MUSIZ available from Shikoku Chemicals Corp.). These imidazole compounds may be used in the form of a salt with trimellitic acid, isocyanuric acid, boron, etc. Modified imidazole curing agents derived from the above-recited imidazole compounds by the same modification methods as for the amine curing agents are also useful.

Commercially available curing agents that can be used as component (B) include ADEKA Hardener EH-3636AS and EH-4351S (dicyandiamide latent curing agents from Adeka Corp.); ADEKA hardener EH-5011S and EH-5046S (imidazole latent curing agents from Adeka); ADEKA hardener EH-4357S, EH-5057P, and EH-5057PK (polyamine latent curing agents from Adeka); Amicure PN-23 and PN-40 (amine adduct latent curing agents from Ajinomoto Finetechno Co., Ltd.); Amicure VDH (hydrazide latent curing agent from Ajinomoto Finetechno); Fujicure FXR-1020 (latent curing agent from T&K TOKA Co., Ltd.); Curesol (imidazole curing agent from Shikoku Chemicals Corp.); TS-G (polythiol curing agent from Shikoku Chemicals Corp.); DPMP and PEMP (polythiol curing agents from SC Organic Chemical Co., Ltd.); and PETG (polythiol curing agent from Yodo Kagaku Co., Ltd.).

The curing agents may be used either individually or in combination.

Imidazole curing agents are preferred in the present invention, with unmodified imidazole compounds, such as 2-methylimidazole and 2-ethyl-4-methylimidazole, being particularly preferred because of their curing performance even in relatively small amounts and their effectiveness as a curing accelerator when combined with other curing agents.

The amount of the curing agent (B) to be used is not particularly limited and preferably in the range of from 1 to 70 mol, more preferably 1 to 50 mol, even more preferably 3 to 30 mol, per 100 mol of the epoxy resin (A). When components (A) and/or (B) have a molecular weight distribution, the above molar ratio is the one calculated on the basis of the weight average molecular weight determined by GPC.

If necessary, the curing agent can be used in combination with a known epoxy curing accelerator. Examples of useful curing accelerators include phosphines, such as triphenylphosphine; phosphonium salts, such as tetraphenylphosphonium bromide; amines, such as benzyldimethylamine and 2,4,6-tris(dimethylaminomethyl)phenol; quaternary ammonium salts, such as trimethylammonium chloride; ureas, such as 3-(p-chlorophenyl)-1,1-dimethylurea, 3-(3,4-dichlorophenyl)-1,1-dimethylurea, 3-phenyl-1,1-dimethylurea, isophorone diisocyanate-dimethylurea, and tolylene diisocyanate-dimethylurea; and complex compounds between boron trifluoride and amines, and between boron trifluoride and ether compounds. The curing accelerators may be used either individually or in combination thereof. The curing accelerator content in the curing resin composition is not particularly limited and is decided as appropriate to the intended use of the curing resin composition.

The imide compound (C) is at least one member selected from the compounds represented by formulae (1-1), (1-2), and (1-3): thus by using such the imide compounds to provide a curing resin composition having a good balance between curing properties and storage stability.

[Chem.2]

(1-1)

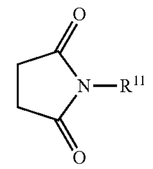

(1-2)

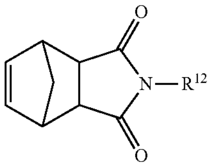

(1-3)

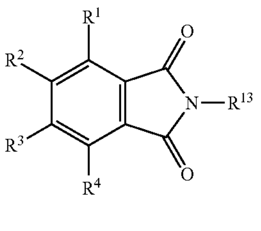

Wherein $R^{11}$ represents an optionally substituted alkyl group having 1 to 10 carbon atoms, an optionally substituted aryl group having 6 to 20 carbon atoms, or an optionally substituted arylalkyl group having 7 to 20 carbon atoms; $R^1$, $R^2$, $R^3$, and $R^4$ each independently represent a hydrogen atom, an alkyl group having 1 to 10 carbon atoms, an alkoxy group having 1 to 10 carbon atoms, a haloalkyl group having 1 to 10 carbon atoms, a haloalkoxy group having 1 to 10 carbon atoms, an alkoxycarbonyl group having 2 to 10 carbon atoms, a halogen atom, a nitro group, a nitrile group, an amino group, or a glycidyloxy group; $R^{12}$ and $R^{13}$ each independently represent a hydrogen atom, an optionally substituted alkyl group having 1 to 10 carbon group, an optionally substituted aryl group having 6 to 20 carbon atoms, or an optionally substituted arylalkyl group having 7 to 20 carbon atoms; and the substituent optionally being on $R^{11}$, $R^1$, $R^2$, $R^3$, $R^4$, $R^{12}$ and $R^{13}$ is an alkyl group with 1 to 10 carbon atoms, an alkoxy group with 1 to 10 carbon atoms, a haloalkyl group with 1 to 10 carbon atoms, a haloalkoxy group with 1 to 10 carbon atoms, a halogen atom, a nitro group, a nitrile group, an amino group, or a glycidyloxy group.

In formulae (1-1), (1-2), and (1-3), the C1-C10 alkyl group includes methyl, ethyl, propyl, isopropyl, butyl, isobutyl, sec-butyl, tert-butyl, amyl, isoamyl, sec-amyl, tert-amyl, hexyl, heptyl, octyl, isooctyl, tert-octyl, 2-ethylhexyl, nonyl, isononyl, decyl, and isodecyl. The C1-C10 alkoxy group includes methoxy, ethoxy, propoxy, isopropoxy, butoxy, amyloxy, hexyloxy, heptyloxy, octyloxy, and 2-ethylhexyloxy. The C6-C20 aryl group includes phenyl, naphthyl, and anthracenyl. The halogen atom includes fluorine, chlorine, bromine, and iodine atoms. The C7-C20 arylalkyl group includes groups with 7 to 20 carbon atoms derived from the above-recited alkyl groups by displacing at least one hydrogen atom with the above-recited aryl group. The C1-C10 haloalkyl and haloalkoxy groups include the above-recited C1-C10 alkyl and alkoxy groups with at least one of their hydrogen atoms displaced with the above-recited halogen atom. The C2-C10 alkoxycarbonyl group includes the above-recited C1-C10 alkoxy groups with a carbonyl group bonded to their oxygen atom.

Preferred of the compounds of formula (1-1) are those in which $R^{11}$ is a group represented by formula (A):

[Chem.3]

(A)

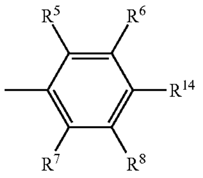

wherein $R^5$, $R^6$, $R^7$, and $R^8$ each independently represent a hydrogen atom, an alkyl group with 1 to 10 carbon atoms, an alkoxy group with 1 to 10 carbon atoms, a haloalkyl group with 1 to 10 carbon atoms, a haloalkoxy group with 1 to 10 carbon atoms, a halogen atom, a nitro group, a nitrile group, an amino group, or a glycidyloxy group; $R^{14}$ represents a hydrogen atom, an optionally substituted alkyl group with 1 to 10 carbon atoms, an optionally substituted aryl group with 6 to 20 carbon atoms, or an optionally substituted arylalkyl group with 7 to 20 carbon atoms; and the substituent optionally being on $R^5$, $R^6$, $R^7$, $R^8$, and $R^{14}$ is an alkyl group with 1 to 10 carbon atoms, an alkoxy group with 1 to 10 carbon atoms, a haloalkyl group with 1 to 10 carbon atoms, a haloalkoxy group with 1 to 10 carbon atoms, a halogen atom, a nitro group, a nitrile group, an amino group, or a glycidyloxy group.

Particularly preferred are those in which $R^5$, $R^6$, $R^7$, and $R^8$ are each hydrogen, and $R^{14}$ is a C1-10 alkyl group, a phenethyl group, or a phenyl group substituted with methoxy.

Examples of the C1-C10 alkyl, C1-C10 alkoxy, C1-C10 haloalkyl, C1-C10 haloalkoxy, C6-C20 aryl, and optionally substituted C7-C20 arylalkyl in formula (A) are the same as those enumerated for the corresponding groups in formulae (1-1), (1-2), and (1-3).

Of the compounds represented by formula (1-2) preferred are those in which $R^{12}$ is a C1-C10 alkyl group or a phenyl group substituted with trifluoromethyl or methoxy.

Of the compounds represented by formula (1-3) preferred are those in which $R^1$, $R^2$, $R^3$, and $R^4$ are each hydrogen, methyl, halogen, nitro, or butoxycarbonyl; and $R^{13}$ is a C1-C10 alkyl group or a phenyl group substituted with methoxy.

Specific examples of the imide compounds of formulae (1-1), (1-2), and (1-3) are shown below.

[Chem. 4]

EHPI

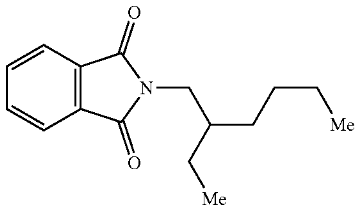

[Chem. 5]

EHBPI

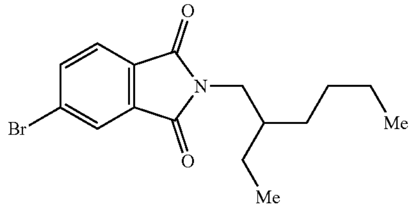

[Chem. 6]

EHMPI

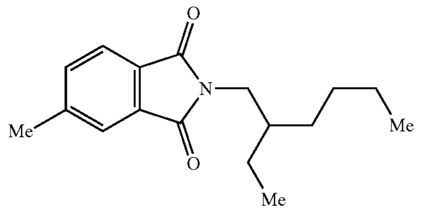

[Chem. 7]

EHNPI

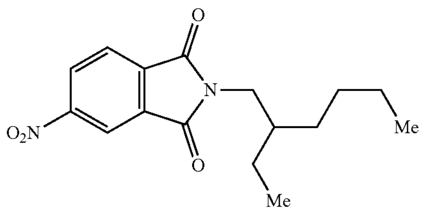

-continued

[Chem. 8]

EHPI-BEST

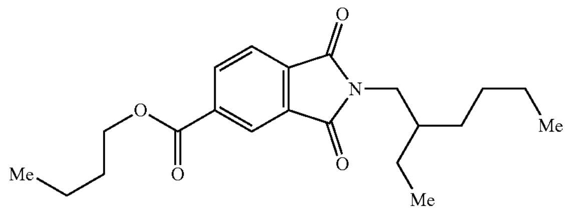

[Chem. 9]

MPI

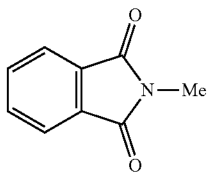

[Chem. 10]

PPI

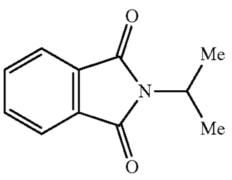

[Chem. 11]

HPI

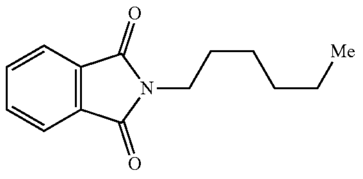

[Chem. 12]

MPPI

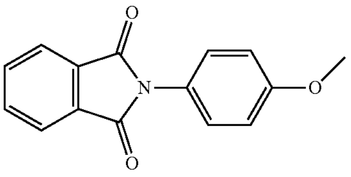

[Chem. 13]

PESI

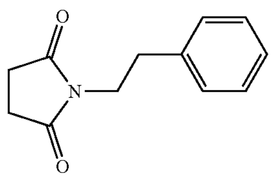

[Chem. 14]

EHSI

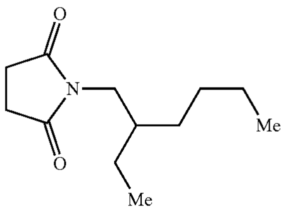

-continued

[Chem. 15]

HSI

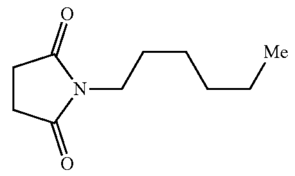

[Chem. 16]

MPSI

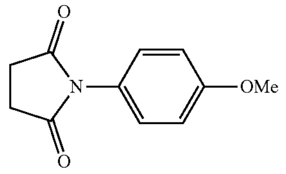

[Chem. 17]

EHPNI

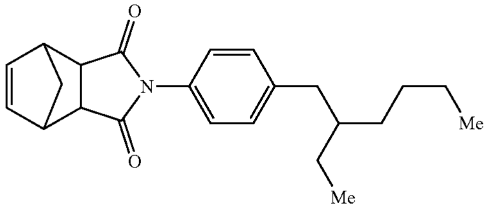

[Chem. 18]

TFMPNI

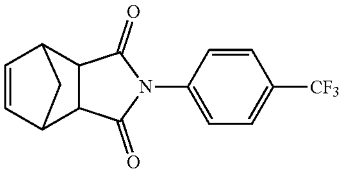

The process for preparing the imide compound (C) is not particularly restricted. For example, the imide compound (C) can be obtained by the following processes:

(1) Thermal imidization: an acid anhydride and an amino-containing compound are allowed to react at a temperature of 150° C. or lower, e.g., 0° to 120° C., preferably 40° to 100° C., to synthesize an amic acid compound, which is then imidized at an elevated temperature of 100° to 200° C.

(2) Chemical imidization: an amic acid compound synthesized by the same process as in (1) is imidized using an imidizing agent, such as acetic anhydride.

(3) Azeotropic dehydrative imidization: an amic acid compound synthesized by the same process as in (1) is imidized by heating under reflux in a solvent for azeotropic dehydration in the absence or presence of a catalyst.

The process (1) is the most preferred.

The acid anhydride used in the preparation of the imide compound includes succinic anhydride, phthalic anhydride, 3-bromophthalic anhydride, 3-methylphthalic anhydride, 3-nitrilophthalic anhydride, norbornene-2,3-dicarboxylic anhydride, and methylnorbornene-2,3-dicarboxylic anhydride. The amino-containing compound includes methylamine, ethylamine, propylamine, isopropylamine, butylamine, isobutylamine, pentylamine, hexylamine, heptylamine, octylamine, 2-ethylhexylamine, nonylamine, decylamine, benzylamine, 2-phenylethylamine, aniline, p-methoxyaniline, and p-trifluoromethylaniline.

The imidization reaction is preferably carried out in an organic solvent. Examples of the solvent include, but are not limited to, saturated hydrocarbons, e.g., pentane, hexane, heptane, and cyclohexane; aromatic hydrocarbons, e.g., benzene, toluene, xylene, and ethylbenzene; halogenated hydrocarbons, e.g., dichloromethane, chloroform, carbon tetrachloride, dichloroethane, chlorobenzene, and dichlorobenzene; ethers, e.g., diethyl ether, diisopropyl ether, 1,2-dimethoxyethane, bis(2-methoxyethyl) ether, 1,2-bis(2-methoxyethoxy)ethane, bis[2-(2-methoxyethoxy)ethyl] ether, tetrahydrofuran, 1,3-dioxane, 1,4-dioxane, and anisole; phenols, e.g., phenol, o-chlorophenol, m-chlorophenol, p-chlorophenol, o-cresol, m-cresol, p-cresol, 2,3-xylenol, 2,4-xylenol, 2,5-xylenol, 2,6-xylenol, 3,4-xylenol, and 3,5-xylenol; amides, e.g., N,N-dimethylformamide, N,N-dimethylacetamide, N,N-diethylacetamide, N,N-dimethylmethoxyacetamide, and hexamethylphosphoramide; lactams, e.g., N-methyl-2-pyrrolidone and N-methylcaprolactam; sulfur-containing solvents, e.g., dimethyl sulfoxide, diphenyl sulfoxide, dimethylsulfone, diphenylsulfone, and sulfolane; and 1,3-dimethyl-2-imidazolidinone. These organic solvents can be used either individually or in combination.

The amount of the solvent to be used is not critical and usually ranges from 1 to 10000 parts, preferably 10 to 500 parts, by mass per part by mass of the sum of the acid anhydride and amino-containing compound. The imidization reaction is preferably conducted with the reactants dissolved in the organic solvent or may be performed in a slurried condition.

The imidization reaction may be carried out in the presence of an organic base catalyst or an acid catalyst. The organic base catalyst includes triethylamine, tributylamine, tripentylamine, N,N-dimethylaniline, N,N-diethylaniline, pyridine, α-picoline, β-picoline, γ-picoline, 2,4-lutidine, 2,6-lutidine, quinoline, and isoquinoline, with pyridine and γ-picoline being preferred. These organic base catalysts may be used either individually or in combination.

The acid catalyst includes inorganic acids, e.g., hydrochloric acid, hydrogen bromide, hydrogen iodide, sulfuric acid, sulfuric anhydride, nitric acid, phosphoric acid, phosphorous acid, phosphotungstic acid, and phosphomolybdic acid; sulfonic acids, e.g., methanesulfonic acid, ethanesulfonic acid, trifluoromethanesulfonic acid, benzenesulfonic acid, and p-toluenesulfonic acid; carboxylic acids, e.g., acetic acid and oxalic acid; halogenated carboxylic acids, e.g., chloroacetic acid, dichloroacetic acid, trichloroacetic acid, fluoroacetic acid, difluoroacetic acid, and trifluoroacetic acid; solid acids, such as silica, alumina, and active clay; and cation exchange resins. Among them, sulfuric acid, phosphoric acid, and p-toluenesulfonic acid are suitable. These acid catalysts may be used either individually or in combination. The acid catalyst may be in the form of a salt with a diamine compound.

The amount of the catalyst used is not particularly limited as long as the reaction rate substantially increases, but is usually 0.001 to 10 mol, preferably 0.005 to 5 mol, more preferably 0.01 to 1 mol, per mole of the sum of the acid anhydride and amino-containing compound.

The overall reaction duration for the synthesis of an amic acid compound and its subsequent imidization depends on several factors, including the reactant composition, organic solvent, catalyst type, the type and amount of the solvent used for azeotropic dehydration, and reaction temperature. This reaction time is roughly 1 to 24 hours, usually several hours. To provide a guidance to the reaction time, in the case of direct thermal imidization of the amic acid compound as synthesized, the reaction is continued until almost the theoretical amount of water is distilled off.

The reaction pressures in the reaction for the formation of an amic acid compound and the imidization are not critical, and the reactions usually proceed under atmospheric pressure. The reaction atmosphere is usually, but not limited to, an air, nitrogen, helium, neon, or argon atmosphere. An inert gas atmosphere such as a nitrogen or argon atmosphere is preferred.

The imide compound as a product can be isolated from the reaction mixture of the acid anhydride and amino-containing compound by any method. When the product precipitates from the reaction solvent, it is isolated by filtration or centrifugal separation. When the product is dissolved in the reaction solvent, it is precipitated by, for example, evaporating the solvent under reduced pressure, adding a poor solvent to the reaction mixture, or pouring the reaction mixture into a poor solvent, followed by filtration or centrifugation to isolate the product.

When needed, the isolated imide compound can be purified by any known techniques, such as distillation, recrystallization, column chromatography, sludge treatment, and activated carbon treatment.

The content of the imide compound (C) in the curing resin composition is preferably 1 to 2000 mol, more preferably 10 to 1000 mol, even more preferably 20 to 800 mol, per 100 mol of component (B). With less than 1 mol of the imide compound, the expected effect of component (C) in imparting stability to the curing resin composition may be insufficient. More than 2000 mol of the imide compound can adversely affect the curability of the curing resin composition.

The curing resin composition of the present invention may further contain an antioxidant, such as phosphorus, phenol, and sulfur antioxidants.

Examples of the phosphorus antioxidants include triphenyl phosphite, tris(2,4-di-t-butylphenyl) phosphite, tris (nonylphenyl) phosphite, tris(dinonylphenyl) phosphite, tris (mono-, di-mixed nonylphenyl)phosphite, bis(2-t-butyl-4,6-dimethylphenyl)ethyl phosphite, diphenyl acid phosphite, 2,2'-methylenebis(4,6-di-t-butylphenyl)octyl phosphite, diphenyldecyl phosphite, phenyldiisodecyl phosphite, tributyl phosphite, tris(2-ethylhexyl) phosphite, tridecyl phosphite, trilauryl phosphite, dibutyl acid phosphite, dilauryl acid phosphite, trilauryl trithiophosphite, bis(neopentyl glycol) 1,4-cyclohexane dimethyl diphosphite, bis(2,4-di-t-butylphenyl)pentaerythritol diphosphite, bis(2,6-di-t-butyl-4-methylphenyl)pentaerythritol diphosphite, distearyl pentaerythritol diphosphite, phenyl-4,4'-isopropylidenediphenol pentaerythritol diphosphite, tetra (C12-C15 mixed alkyl)-4,4'-isopropylidene diphenylphosphite, bis[2,2'-methylenebis(4,6-diamylphenyl)] isopropylidene diphenylphosphite, hydrogenated 4,4'-isopropylidenediphenol polyphosphite, bis(octylphenyl) bis [4,4'-n-butylidenebis(2-t-butyl-5-methylphenol)] 1,6-hexanediol diphosphite, tetratridecyl 4,4'-butylidenebis(2-t-butyl-5-methylphenol) diphosphite, hexa(tridecyl) 1,1,3-tris (2-methyl-5-t-butyl-4-hydroxyphenyl)butane triphosphonite, 9,10-dihydro-9-oxa-10-phosphaphenanthrene 10-oxide, and 2-butyl-2-ethylpropanediol 2,4,6-tri-t-butylphenol monophosphite.

Examples of the phenol antioxidants include 2,6-di-t-butyl-p-cresol, 2,6-diphenyl-4-octadecyloxyphenol, stearyl (3,5-di-t-butyl-4-hydroxyphenyl)propionate, distearyl (3,5-di-t-butyl-4-hydroxybenzyl)phosphonate, tridecyl 3,5-di-t-butyl-4-hydroxybenzyl thioacetate, thiodiethylenebis[(3,5-di-t-butyl-4-hydroxyphenyl)propionate], 4,4'-thiobis(6-t-butyl-m-cresol), 2-octylthio-4,6-di(3,5-di-t-butyl-4-hydroxyphenoxy)-s-triazine, 2,2'-methylenebis(4-methyl-6-t-butylphenol), bis[3,3-bis(4-hydroxy-3-t-butylphenyl) butyric acid] glycol ester, 4,4'-butylidenebis(4,6-di-t-butylphenol), 2,2'-ethylidenebis(4,6-di-t-butylphenol), 1,1,3-tris(2-methyl-4-hydroxy-5-t-butylphenyl)butane, bis[2-t-butyl-4-methyl-6-(2-hydroxy-3-t-butyl-5-methylbenzyl) phenyl] terephthalate, 1,3,5-tris[(2,6-dimethyl-3-hydroxy-5-t-butylbenzyl) isocyanurate, 1,3,5-tris(3,5-di-t-butyl-4-hydroxybenzyl) isocyanurate, 1,3,5-tris(3,5-di-t-butuyl-4-hydroxybenzyl)-2,4,6-trimethylbenzene, 1,3,5-tris[(3,5-di-t-butyl-4-hydroxyphenyl)propionyloxyethyl] isocyanurate, tetrakis[methylene-3-(3,5-di-t-butyl-4-hydroxyphenyl)propionate]methane, 2-t-butyl-4-methyl-6-(2-acryloyloxy-3-t-butyl-5-methylbenzyl)phenol, 3,9-bis[2-(3-t-butyl-4-hydroxy-5-methylhydroxycinnamoyloxy)-1,1-dimethylethyl]-2,4,8,10-t etraoxaspiro[5,5]undecane, and triethylene glycol bis[3-(3-t-butyl-4-hydroxy-5-methylphenyl)propionate].

Examples of the sulfur antioxidants include dialkyl thiodipropionates, such as dilauryl, dimyristyl, myristylstearyl, and distearyl esters of thiodipropionic acid; and polyol β-alkylmercaptopropionic acid esters, such as pentaerythritol tetra(β-dodecylmercaptopropionate).

The curing resin composition of the present invention may contain a light stabilizer, such as an ultraviolet (UV) absorber and a hindered amine light stabilizer.

Examples of the UV absorber include 2-hydroxybenzophenones, such as 2,4-dihydroxybenzophenone, 2-hydroxy-4-methoxybenzophenone, 2-hydroxy-4-octoxybenzophenone, 2-hydroxy-4-t-butyl-4'-(2-methacryloyloxyethoxyethoxy)benzophenone, and 5,5'-methylenebis(2-hydroxy-4-methoxybenzophenone); 2-(2-hydroxyphenyl)benzotriazoles, such as 2-(2-hydroxy-5-methylphenyl)benzotriazole, 2-(2-hydroxy-5-t-octylphenyl) benzotriazole, 2-(2-hydroxy-3,5-di-t-butylphenyl)-5-chlorobenzotriazole, 2-(2-hydroxy-3-t-butyl-5-methylphenyl)-5-chlorobenzotriazole, 2-(2-hydroxy-3-dodecyl-5-methylphenyl)benzotriazole, 2-(2-hydroxy-3-t-butyl-5-(C7-C9 mixed)alkoxycarbonylethylphenyl)triazole, 2-(2-hydroxy-3,5-dicumylphenyl)benzotriazole, 2,2'-methylenebis(4-t-octyl-6-benzotriazolylphenol), and polyethylene glycol ester of 2-(2-hydroxy-3-t-butyl-5-carboxyphenyl)benzotriazole; 2-(2-hydroxyphenyl)-1,3,5-triazines, such as 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, and 2-(2-hydroxy-4-octoxyphenyl)-4,6-bis(2,4-dimethylphenyl)-1,3,5-triazine; benzoates, such as phenyl salicylate, resorcinol monobenzoate, 2,4-di-t-butylphenyl 3,5-di-t-butyl-4-hydroxybenzoate, 2,4-di-t-amylphenyl-3,5-di-t-butyl-4-hydroxybenzoate, and hexadecyl 3,5-di-tert-butyl-4-hydroxybenzoate; substituted oxanilides, such as 2-ethyl-2'-ethoxyoxanilide and 2-ethoxy-4'-dodecyloxanilide; and cyanoacrylates, such as ethyl α-cyano-β,β-diphenylacrylate and methyl 2-cyano-3-methyl-3-(p-methoxyphenyl)acrylate.

Examples of the hindered amine light stabilizers include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl) sebacate, bis (1,2,2,6,6-pentamethyl-4-piperidyl) sebacate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, bis(2,2,6,6-tetramethyl-4-piperidyl)•bis (tridecyl)-1,2,3,4-butanetetracarboxylate, bis(1,2,2,6,6-pentamethyl-4-piperidyl)•bis(tridecyl)-1,2,3,4-butanetetracarboxylate, bis(1,2,2,6,6-pentamethyl-4-piperidyl)-2-butyl-2-(3,5-di-t-butyl-4-hydroxybenzyl) malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino) hexane/2,4-dichloro-6-morpholino-s-triazine polycondensate, 1,6-bis(2,2,6,6-tetramethyl-4-piperidylamino)hexane/2,4-dichloro-6-t-octylamino-s-triazine polycondensate, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino-s-triazin-6-ylamino] undecane, and 1,6,11-tris[2,4-bis(N-butyl-N-(1,2,2,6,6-pentamethyl-4-piperidyl)amino-s-triazin-6-ylamino] undecane.

The curing resin composition of the present invention may contain a silane coupling agent. Examples of the silane coupling agents include γ-aminopropyltriethoxysilane, N-β-(aminoethyl)-γ-aminopropyltriethoxysilane, N-β-(aminoethyl)-N'-β-(aminoethyl)-γ-aminopropyltriethoxysilane, γ-anilinopropyltriethoxysilane, γ-glycidoxypropyltriethoxysilane, 0-(3,4-epoxycyclohexyl)ethyltriethoxysilane, vinyltriethoxysilane, N-β-(N-vinylbenzylaminoethyl)-γ-aminopropyltriethoxysilane, γ-methacryloxypropyltrimethoxysilane, γ-chloropropyltrimethoxysilane, and γ-mercaptopropyltrimethoxysilane.

The curing resin composition of the present invention may contain a filler. Examples of the filler include silica, such as fused silica or crystalline silica; powders and spherized beads of magnesium hydroxide, aluminum hydroxide, zinc molybdate, calcium carbonate, silicon carbonate, calcium silicate, potassium titanate, beryllia, zirconia, zircon, forsterite, steatite, spinel, mullite, titania, and so forth; and fibers, such as glass fiber, pulp fiber, synthetic fiber, and ceramic fiber.

The curing resin composition of the present invention may contain various solvents, preferably organic solvents. Examples of the organic solvents include ethers, such as tetrahydrofuran, 1,2-dimethoxyethane, and 1,2-diethoxyethane; alcohols, such as isobutanol, n-butanol, isopropyl alcohol, n-propanol, amyl alcohol, benzyl alcohol, furfuryl alcohol, and tetrahydrofurfuryl alcohol; ketones, such as methyl ethyl ketone, methyl isopropyl ketone, and methyl butyl ketone; aromatic hydrocarbons, such as benzene, toluene, and xylene; triethylamine, pyridine, dioxane, and acetonitrile.

The curing resin composition of the present invention may further contain other various additives according to necessity. Useful additives include phenol compounds, such as biphenol; reactive diluents, such as monoalkyl glycidyl ethers; nonreactive diluents (plasticizers), such as dioctyl phthalate, dibutyl phthalate, benzyl alcohol, and coal tar; reinforcing materials, such as glass cloth, aramid cloth, and carbon fiber; pigments; lubricants, such as candelilla wax, carnauba wax, Japan tallow, Chinese insect wax, bees wax, lanolin, spermaceti, montan wax, petroleum wax, aliphatic waxes, aliphatic esters, aliphatic ethers, aromatic esters, and aromatic ethers; thickeners; thixotropic agents; anti-foaming agents; rust inhibitors; colloidal silica, colloidal alumina; and other commonly used additives. Tacky resins, such as cyanate ester resins, xylene resins, and petroleum resins, may be used in combination.

The curing resin composition of the present invention can be adjusted to balance its curing properties and storage stability and is therefore usable as a one-component curing resin composition. The applications of the curing resin composition of the present invention include, but are not limited to, adhesives for electronic components, sealants for electronic components, casting materials, coatings, and structural adhesives.

EXAMPLES

The present invention will now be illustrated in greater detail with reference to Examples and Comparative Examples, but it should be understood that the present invention is not deemed to be limited thereto.

Examples 1 to 17

A curing resin composition was prepared using a bisphenol A epoxy resin (BISAEP) as component (A), 2-ethyl-4-methylimidazole (2E4MZ) as component (B), and each of the imide compounds of formulae (1-1), (1-2), and (1-3) shown in Table 1 as component (C) in the molar ratio indicated in the table. When the imide compound was a high melting compound, BISAEP and the imide compound were mixed in the indicated molar ratio, once heated to a temperature at which the mixture became a completely uniform liquid, and then cooled to room temperature. A predetermined amount of 2E4MZ was then added thereto to prepare a curing resin composition. The resulting curing resin composition was evaluated for curing properties and storage stability. The results obtained are shown in Table 1.

Comparative Example 1

A curing resin composition was prepared and evaluated for curing properties and storage stability in the same manner as in Examples 1 to 17, except that no imide compounds were used. The results are shown in Table 1.

Synthesis of Phenylmaleimide Oligomer (PMI)

In a 2-neck flask were added 522.1 g of phenylmaleimide and 14.8 g of azobisisobutyronitrile (AIBN). After purging with nitrogen, 3 ml of DMF was added, and the reaction system was degassed 5 times. The flask with its contents was heated at 60° C. for 24 hours. After completion of the reaction, methanol was added, and the precipitate was collected by filtration and dried under reduced pressure at 60° C. for 6 hours to give 0.2865 g of PMI in a yield of 55%.

GPC (10 mM LiBr in DMF): $Mn=3.5\times10^3$; $Mw=5.6\times10^3$; $Mw/Mn=1.58$

Comparative Example 2

A curing resin composition was prepared and evaluated for curing properties and storage stability in the same manner as in Examples 1 to 17, except that PMI was used in place of the imide compound. The results are shown in Table 1.

Curing Properties:

The curing resin composition was placed in a glass bottle and cured by heating at 150° C. for 1 hour. The cured product was graded Pass (P) if it exhibited a tack-free, flawless solid state, and Fail (F) if it did not meet these criteria.

Storage Stability:

A glass bottle with a diameter of 13 mm and a height of 40 mm was filled with the curing resin composition to one-fifth its height from the bottom and then closed with a cap. The bottle was tilted at 90° on a flat surface, and the state of the curing resin composition was observed after one minute to determine its fluidity. If a change in the shape of the curable resin composition was observed, the composition was considered fluid. Conversely, if no change was observed, the composition was considered non-fluid. The evaluation was carried out after each day of standing, and the evaluation was continued until the resin composition no longer exhibited any fluidity. The duration of fluidity was recorded in Table 1. The storage stability of the curing resin composition was graded as Pass (P) if the fluidity could be maintained for more than two days, and Fail (F) if this criterion was not met.

TABLE 1

| | | | Example 1 | 2 | 3 | 4 | 5 | 6 | 7 | 8 | 9 | 10 |
|---|---|---|---|---|---|---|---|---|---|---|---|---|
| Compounding Ratio | (A) | BISAEP | 100 | 100 | 100 | 100 | 100 | 100 | 100 | 100 | 100 | 100 |
| | (B) | 2E4MZ | 10 | 10 | 10 | 10 | 10 | 10 | 10 | 10 | 10 | 10 |
| | (C) | EHPI | 10 | | | | | | | | | |
| | | EHBPI | | 10 | | | | | | | | |
| | | EHMPI | | | 10 | | | | | | | |
| | | EHNPI | | | | 10 | | | | | | |
| | | EHPI-BEST | | | | | 10 | | | | | |
| | | MPI | | | | | | 10 | | | | |
| | | PPI | | | | | | | 10 | | | |
| | | HPI | | | | | | | | 10 | | |
| | | MPPI | | | | | | | | | 10 | |
| | | PESI | | | | | | | | | | 10 |
| | | EHSI | | | | | | | | | | |
| | | HSI | | | | | | | | | | |
| | | MPSI | | | | | | | | | | |
| | | EHPNI | | | | | | | | | | |
| | | PMI | | | | | | | | | | |
| Curing Properties | | | P | P | P | P | P | P | P | P | P | P |
| Storage Stability | | Duration (days) | 5 | 5 | 4 | 4 | 6 | 5 | 5 | 5 | 5 | 3 |
| | | Pass or Fail | P | P | P | P | P | P | P | P | P | P |

| | | | Example 11 | 12 | 13 | 14 | 15 | 16 | 17 | Comp. Ex. 1 | 2 |
|---|---|---|---|---|---|---|---|---|---|---|---|
| Compounding Ratio | (A) | BISAEP | 100 | 100 | 100 | 100 | 100 | 100 | 100 | 100 | 100 |
| | (B) | 2E4MZ | 10 | 10 | 10 | 10 | 10 | 10 | 10 | 10 | 10 |
| | (C) | EHPI | | | | | 5 | 20 | 30 | | |
| | | EHBPI | | | | | | | | | |
| | | EHMPI | | | | | | | | | |
| | | EHNPI | | | | | | | | | |
| | | EHPI-BEST | | | | | | | | | |
| | | MPI | | | | | | | | | |
| | | PPI | | | | | | | | | |
| | | HPI | | | | | | | | | |
| | | MPPI | | | | | | | | | |
| | | PESI | | | | | | | | | |
| | | EHSI | 10 | | | | | | | | |
| | | HSI | | 10 | | | | | | | |
| | | MPSI | | | 10 | | | | | | |
| | | EHPNI | | | | 10 | | | | | |
| | | PMI | | | | | | | | | 10 |
| Curing Properties | | | P | P | P | P | P | P | P | P | P |
| Storage Stability | | Duration (days) | 3 | 3 | 5 | 4 | 4 | 6 | 7 | 2 | 2 |
| | | Pass or Fail | P | P | P | P | P | P | P | F | F |

As clearly demonstrated in Table 1, the curing resin composition of the present invention, which contains the specific imide compound, is excellent in curing properties and storage stability.

INDUSTRIAL APPLICABILITY

The curing resin composition of the present invention can be formulated as one-component curing resin composition due to its excellent curing properties and storage stability and is suitable for use as adhesives for electronic components, sealants for electronic components, casting materials, coatings, structural adhesives and so forth.

The invention claimed is:

1. A curing resin composition comprising (A) an epoxy resin, (B) a curing agent, and (C) at least one of imide compounds represented by formulae (1-1), (1-2), and (1-3):

(1-1)

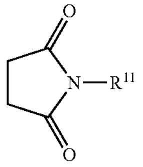

(1-2)

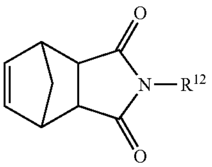

(1-3)

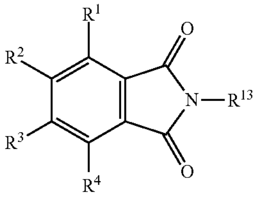

wherein $R^{11}$ represents an optionally substituted alkyl group having 1 to 10 carbon atoms, an optionally substituted aryl group having 6 to 20 carbon atoms, or an optionally substituted arylalkyl group having 7 to 20 carbon atoms; $R^1$, $R^2$, $R^3$, and $R^4$ each independently represent a hydrogen atom, an alkyl group having 1 to 10 carbon atoms, an alkoxy group having 1 to 10 carbon atoms, a haloalkyl group having 1 to 10 carbon atoms, a haloalkoxy group having 1 to 10 carbon atoms, an alkoxycarbonyl group having 2 to 10 carbon atoms, a halogen atom, a nitro group, a nitrile group, an amino group, or a glycidyloxy group; R12 and R13 each independently represent a hydrogen atom, an optionally substituted alkyl group having 1 to 10 carbon atoms, an optionally substituted aryl group having 6 to 20 carbon atoms, or an optionally substituted arylalkyl group having 7 to 20 carbon atoms; and the substituent optionally being on $R^{11}$, $R^{12}$ and $R^{13}$ is an alkyl group with 1 to 10 carbon atoms, an alkoxy group with 1 to 10 carbon atoms, a haloalkyl group with 1 to 10 carbon atoms, a haloalkoxy group with 1 to 10 carbon atoms, a halogen atom, a nitro group, a nitrile group, or an amino group.

2. The curing resin composition according to claim 1, wherein the curing agent (B) comprises an imidazole curing agent.

3. The curing resin composition according to claim 1, wherein the curing agent (B) is present in an amount of 0.01 to 100 mol per 100 mol of the epoxy resin (A).

4. The curing resin composition according to claim 1, wherein the imide compound (C) is present in an amount of 1 to 2000 mol per 100 mol of the curing agent (B).

5. A cured product of the curing resin composition according to claim 1.

6. The curing resin composition according to claim 1, being a one-component curing resin composition.

7. The curing resin composition according to claim 2, wherein the curing agent (B) is present in an amount of 0.01 to 100 mol per 100 mol of the epoxy resin (A).

8. The curing resin composition according to claim 2, wherein the imide compound (C) is present in an amount of 1 to 2000 mol per 100 mol of the curing agent (B).

9. The curing resin composition according to claim 3, wherein the imide compound (C) is present in an amount of 1 to 2000 mol per 100 mol of the curing agent (B).

10. The curing resin composition according to claim 7, wherein the imide compound (C) is present in an amount of 1 to 2000 mol per 100 mol of the curing agent (B).

11. A cured product of the curing resin composition according to claim 2.

12. A cured product of the curing resin composition according to claim 3.

13. A cured product of the curing resin composition according to claim 4.

14. A cured product of the curing resin composition according to claim 7.

15. A cured product of the curing resin composition according to claim 8.

16. A cured product of the curing resin composition according to claim 9.

17. A cured product of the curing resin composition according to claim 10.

18. The curing resin composition according to claim 2, being a one-component curing resin composition.

19. The curing resin composition according to claim 3, being a one-component curing resin composition.

20. The curing resin composition according to claim 4, being a one-component curing resin composition.

* * * * *